Sept. 6, 1955      O. WEITZ      2,717,105

SEED DISTRIBUTOR FOR DRILLS

Filed Oct. 15, 1949

INVENTOR
OTTO WEITZ
BY Richards Geier
ATTORNEYS

United States Patent Office 2,717,105
Patented Sept. 6, 1955

2,717,105

SEED DISTRIBUTOR FOR DRILLS

Otto Weitz, Butzbach, Hessen, Germany, assignor to Firma A. J. Tröster, Butzbach, Hessen, Germany Application October 15, 1949, Serial No. 121,615

Claims priority, application Germany November 12, 1948

3 Claims. (Cl. 222—283)

This invention relates to a seed distributor and refers more particularly to a seed distributor for drills of the type wherein delivery wheels are movable axially to vary the size of the delivery aperture.

An object of the present invention is to provide a construction wherein the clogging of grain, caused by the small size of the apertures of the delivery wheels, is effectively avoided.

Another object is the provision of a construction wherein seed is properly fed to the delivery wheels and is then ejected in such manner that the seed-containing chambers are emptied gradually and uniformly, with the result that an even distribution of the seed takes place.

The objects of the present invention may be realized through the provision of a construction wherein the isolating sleeve and the delivery wheel on the one hand, and the closing ring on the other hand, are provided with oblique surfaces which form a funnel-shaped inlet and outlet for the seed. These outlets are formed in the delivery wheel which operates in the same manner, irrespective of the size of the delivery aperture.

Due to the provision of these oblique faces, the effective size of the operative aperture at the base of its delivery chamber is reduced, with the result that the uniformity of the seed flow is improved, particularly when the apertures are small since the design of the ribs is the most important factor in interrupting the continuity of the flow. A further advantage of the oblique arrangement of the faces is that a comparatively long delivery edge is provided even when the apertures are quite small, with the result that the overlapping of the lower wedge remains effective.

According to a further preferred embodiment of the inventive idea the lower wedge has a cut-out portion of so-called "swallow-tail" shape. It is particularly advantageous to arrange the cut-out portion somewhat off center in relation to the central line of the wedge. Due to this arrangement the overlapping remains effective at all aperture sizes.

The invention will appear more clearly from the following detailed description when taken in connection with the accompanying drawing showing, by way of example, a preferred embodiment of the inventive idea.

Figure 1:
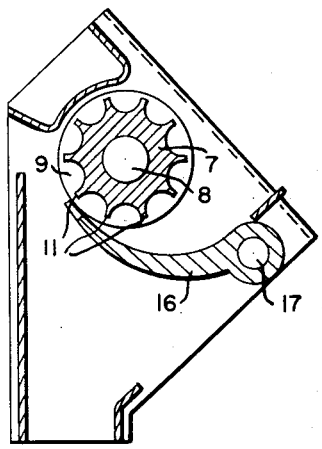
Figure 1 is a sectional view showing a sowing wheel with a recessed lower wedge.

The device shown in the drawings includes a distributing wheel 7 which is mounted upon the shaft 8. The wheel 7 is movable in the direction of its axis in the usual manner. An isolating sleeve 9 is integral with the shaft 8. The sleeve 9 is provided with an oblique or sloping face 10 which is directed toward the wheel. The wheel 7 is provided with ribs 11.

The casing 12 carries by means of any suitable member 22 a closing ring 13 having an oblique or sloping face 14 which is directed toward the face 10 of the sleeve 9.

Figure 4:
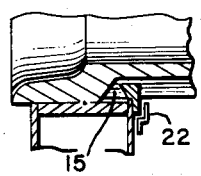
Figure 4 is a sectional view illustrating the arrangement for a small size aperture.
Figure 5:
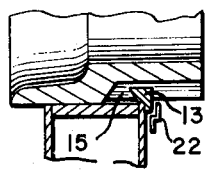
Figure 5 is similar to Figure 4 and shows the arrangement for a medium size aperture.
Figure 6:
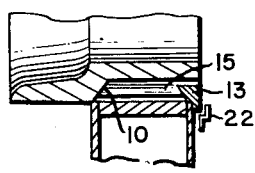
Figure 6 is similar to Figures 4 and 5 and shows the arrangement for a large size aperture.

Due to this arrangement a space or chamber 15 is formed between the faces 10 and 14. This space 15 is available for the feeding of seed and for subsequent ejection of the seed. As a result of the sloping of the faces 10 and 14 the space 15 has the shape of a funnel, irrespective of the size of aperture as shown in Figures 4, 5, and 6. Due to this arrangement the clogging of the seed is effectively avoided and a relatively long ejection edge is provided for every setting.

Figure 4A:
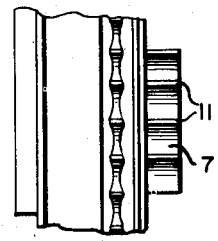
Figure 4a is a plan view corresponding to the position shown in Figure 4.
Figure 5A:
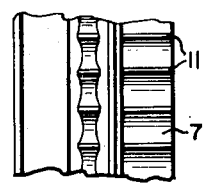
Figure 5a is similar to Figure 4a and shows the arrangement for a medium size aperture.
Figure 6A:
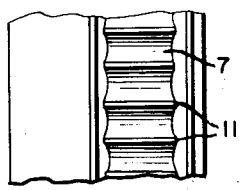
Figure 6a is similar to Figures 4a and 5a and shows the arrangement for a large size aperture.

Figures 4a, 5a and 6a show plan views of these different settings for small size, medium size and large size apertures.

Figure 2:
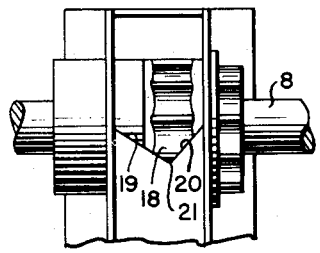
Figure 2 is a plan view of the wheel shown in Figure 1.
Figure 2A:
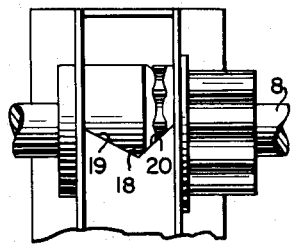
Figure 2a is similar to Figure 2 and shows the delivery wheel in its narrowest end position.
Figure 3:
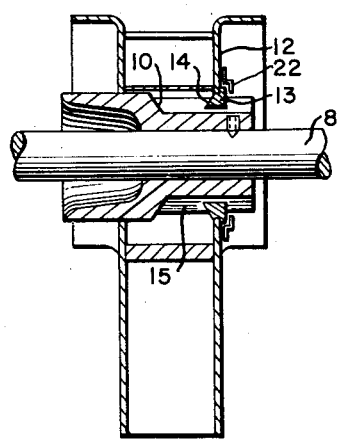
Figure 3 is a longitudinal section through the device.

As shown in Figures 1 and 2, the device is provided with a lower wedge 16 which is pivoted at 17 to the casing so as to be adjustable toward and away from the ribs 11. The wedge 16 has a cut-out recess 18 provided with inclined edges 19 and 20 meeting at 21. As shown in Figure 2 the edge 20 is shorter than the edge 19 so that the recess 18 is somewhat off center. Figure 2a illustrates the arrangement wherein the delivery wheel 7 is placed in its narrowest end position for small size grain, corresponding to Figure 4. Due to this shape of the recess 18 full overlapping is attained at the medium size aperture which is the one most commonly used, and its overlapping remains sufficiently effective at small size apertures. Consequently, by the use of the device in accordance with the present invention any seed, from the finest to the coarsest, can be sown easily and uniformly.

In operation, the seed fills the chamber 15 and then is ejected for sowing purposes through an aperture, the size of which is adjusted depending upon the size of the grain. The seed distribution is further facilitated through the provision of the wedge 16 with the recess 18 located at the point of delivery.

What is claimed is:

1. In a seed distributor for drills, a rotary shaft, a distributing axially movable wheel upon said shaft, said wheel having radially projecting ribs, an isolating sleeve located upon one side of said wheel; a casing enclosing said wheel, a closing ring connected with said casing and enclosing said wheel, said sleeve having a sloping face, said ring and said face forming a trough-like adjustable chamber receiving and feeding the seeds, a wedge, means pivotally supporting said wedge adjacent said ribs to adjust the distance of said wedge from said ribs, said wedge having an outer edge having a V-shaped recess formed therein, whereby the seeds flow from said wheel and drop over said edge in a continuous stream.

2. In a seed distributor for drills, a rotary shaft, a distributing axially movable wheel upon said shaft, said wheel having radially projecting ribs, an isolating sleeve located upon one side of said wheel; a casing enclosing said wheel and having parallel side walls, a closing ring connected with said casing and enclosing said wheel, said sleeve having a sloping face, said ring and said face forming an adjustable chamber receiving and feeding the seeds, a wedge, and means pivotally supporting said wedge adjacent said ribs to adjust the distance of said wedge from said ribs, said wedge having an outer edge having a V-shaped recess formed therein, said recess having sides extending at different angles to a central plane parallel to said side walls, whereby the seeds flow from said wheel and drop over said edge in a continuous stream.

3. In a seed distributor for drills, a rotary shaft, a distributing axially movable wheel upon said shaft, said wheel having radially projecting ribs, an isolating sleeve located upon one side of said wheel, a casing enclosing said wheel and having parallel side walls, a closing ring connected with said casing and having an inclined front surface located opposite said sleeve, said sleeve further having an inclined face, said ring and said face forming a trough-like adjustable chamber receiving and feeding the seeds, a wedge, and means pivotally supporting said wedge adjacent said ribs to adjust the distance of said wedge from said ribs, said wedge having an outer edge having a V-shaped recess formed therein, said recess having sides extending at different angles to a central plane parallel to said side walls, whereby the seeds flow from said wheel and drop over said edge in a continuous stream.

References Cited in the file of this patent
UNITED STATES PATENTS

| | | |
|---|---|---|
| Re. 9,604 | Hart | Mar. 15, 1881 |
| 155,562 | Winchell | Sept. 29, 1874 |
| 198,495 | Martin | Dec. 25, 1877 |
| 1,867,532 | Scarlett | July 12, 1932 |
| 2,475,381 | Erickson | July 5, 1949 |